Feb. 21, 1967   N. L. DEMEO   3,304,948
MINIATURE PNEUMATIC VALVE
Filed March 12, 1965   2 Sheets-Sheet 1
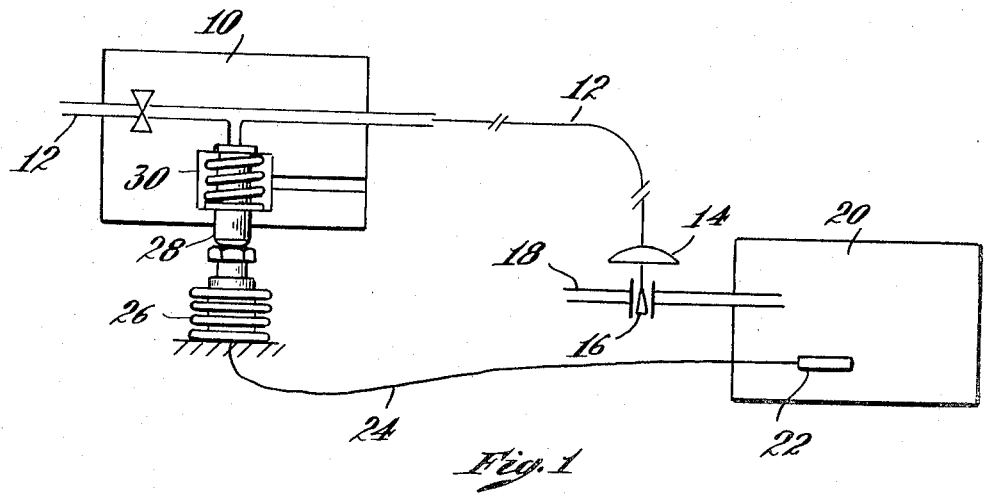
Fig. 1
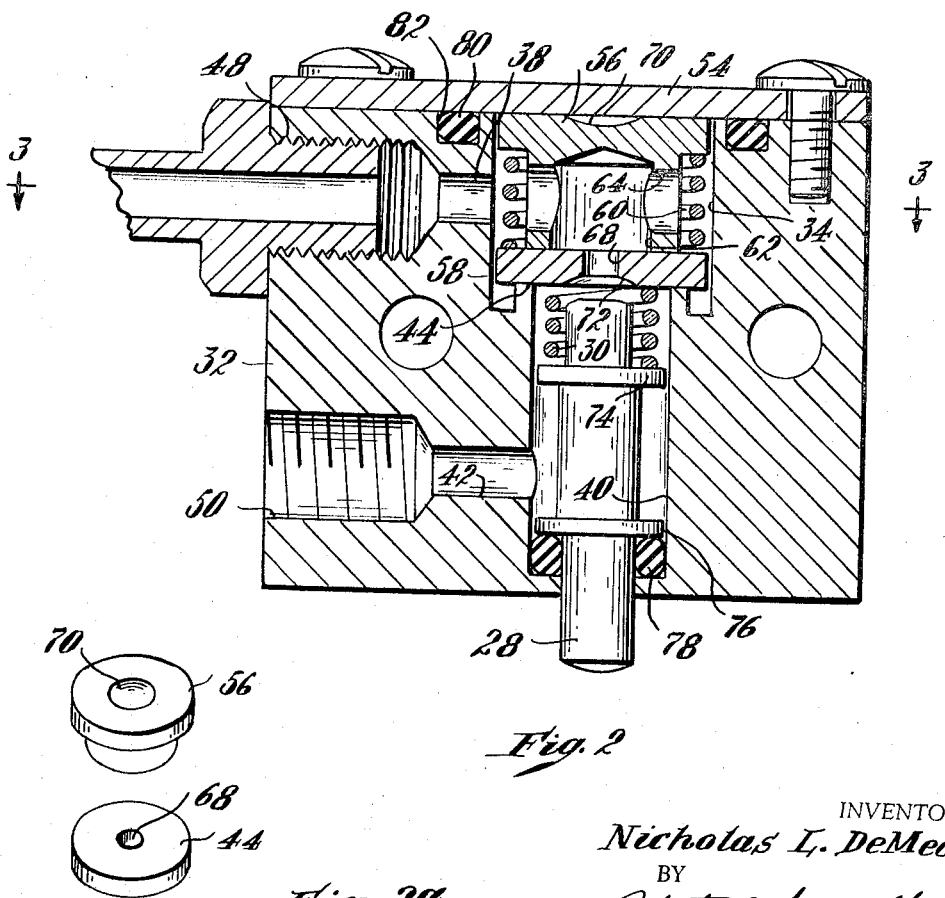
Fig. 2
Fig. 2a
INVENTOR.
Nicholas L. DeMeo
BY
Roberts, Cushman & Grover
ATT'YS

United States Patent Office 3,304,948
Patented Feb. 21, 1967

3,304,948
MINIATURE PNEUMATIC VALVE
Nicholas L. Demeo, Medford, Mass., assignor to United Electric Controls Company, Watertown, Mass., a corporation of Massachusetts
Filed Mar. 12, 1965, Ser. No. 439,363
8 Claims. (Cl. 137—270)

This invention relates to pneumatic valves and has for its principal objects to provide a miniature pressure change valve of extremely simple construction, embodying a minimum number of parts, providing for proportionate pressure change and providing for practical purposes of an on-off switch substantially equivalent to a snap-action electric switch; to provide a miniature valve embodying parts which enable changing it from direct action to reverse action without modification of the valve actuator; to provide a valve embodying means responsive to a differential pressure change of 1 to 2 pounds over a range of 3 to 15 p.s.i.; to provide a valve operable throughout a temperature range of from —50° to +150°; and to provide a valve which is shock-resistant in excess of 5 G's in both vertical and horizontal planes and vibration-resistant up to 80 c.p.s. at a magnitude of .010 inch in vertical and horizontal planes.

As herein illustrated, the valve comprises a valve body containing a valve chamber through which a fluid is adapted to flow from a source to pressure-responsive means, a bypass passage in communication with the chamber, a valve element mounted in the chamber across the bypass passage, and an actuator normally held away from the valve element, said valve element and actuator being collectively operble to control flow from the chamber to the bypass passage; characterized in that the valve element is reversible in the chamber and is operable, in response to depression of the actuator, on the one hand to reduce the flow through the bypass passage and on the other hand to increase the flow therethrough. In the one position the valve is wide open and depression of the actuator closes it in proportion to movement of the actuator and in the other position the valve is closed and the actuator opens it in proportion to movement of the actuator. The chamber contains a valve seat concentric with the bypass passage and a spring holds the valve element in either of its positions against the seat. The actuator is supported for movement perpendicular to the valve element and a spring mounted between it and the valve element holds the actuator separated from the valve element. The valve chamber cylindrical, its axis being perpendicular to the flow of fluid through it, the valve seat is at the bottom of the chamber surrounding the bypass passage and the valve element is cylindrical in form, having substantially flat ends adapted to seat on the valve seat, and of such diameter as to closely fit the chamber and to provide lateral guiding surfaces which prevent lateral movement of the valve element. The valve element has a diametrical hole through it intermediate its ends and an axial hole intersecting the diametrical hole. One end of the valve element contains a center hole in communication with the axial hole and is constituted by a flat valve disc mounted across the open end of the valve element. The valve element between its ends is of smaller diameter than the chamber and the spring is disposed about the smaller diameter portion with its ends bearing against the ends of the valve element. The spring mounted on the valve element is more stiffly resistant to compression than the spring mounted on the actuator.

The invention will now be described in greater detail with reference to the accompanying drawings wherein:

FIG. 1 diagrammatically illustrates an industrial application of the valve;

FIG. 2 is a vertical section through the valve taken on the line 2—2 of FIG. 3 showing the arrangement of its component parts for direct action;

FIG. 2a is an elevation of the valve element removed from the valve body showing its component parts separated;

Figure 3:
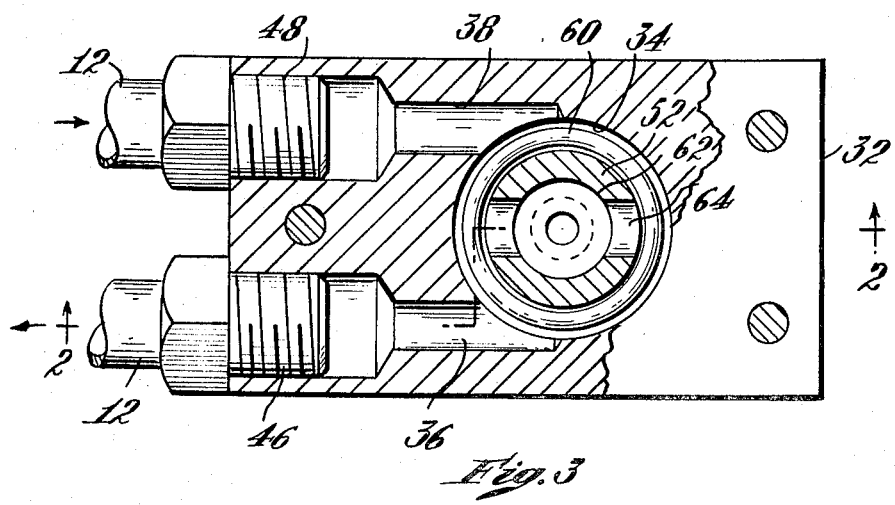
FIG. 3 is a section taken on the line 3—3 of FIG. 2.

The valve which forms the subject matter of this invention is of miniature size, corresponds in size, for example, to electric microswitches, is designed to provide for proportionate operation, although affording for all practical purposes an on-off operation, and is designed to embody operating parts which will be substantially unaffected by shock in excess of 5 G's, in both vertical and horiozntal planes and by vibrations up to 80 c.p.s. at an amplitude of .010 inch in both vertical and horizontal planes.

As shown diagrammatically (FIG. 1), the valve 10 is interposed in a pressure line 12 for supplying pressure to the diaphragm 14 of a diaphragm-actuated valve 16 which, in turn, controls flow of a fluid (liquid or gas) through a conductor 18 for industrial application, for example a refrigerator chamber or reaction chamber 20. A sensing bulb 22 is mounted in a suitable position in the chamber 20 for determining the temperature and/or pressure therein and by way of a capillary tube 24 supplies pressure to a bellows 26 which, in turn, is operable by expansion and contraction to depress a valve actuator 28 projecting from the valve 10. A spring 30 normally holds the valve actuator 28 distended.

As illustrated in FIG. 2 the valve 10 is direct-acting, that is, when the valve actuator 28 is depressed by expansion of the bellows 26 sufficiently to close the valve, as will appear hereinafter, the full pressure from the line 12 will be delivered to the diaphragm-actuator valve 16. Movement of the valve between open and closed positions is proportional to movement of the valve actuator. As the bellows 26 expands the valve is gradually closed and as it contracts the valve is gradually opened so that a proportional amount of the fluid will flow through a bypass.

The valve comprises a valve body 32 containing a cylindrical valve chamber 34, spaced parallel inlet and outlet passages 36 and 38 which enter the chamber, as shown in FIG. 3, at opposite sides and in a plane perpendicular to the axis of the chamber, and a cylindrical bypass 42 of smaller diameter than the valve chamber which enters the bottom of the valve chamber and is concentric therewith as shown in FIG. 2. The bypass is provided intermediate its ends with a lateral passage 42 parallel to the passages 36 and 38. An annular valve seat 44 is provided at the bottom of the valve chamber surrounding and concentric with the bypass. Tapped and threaded openings 46, 48 and 50 are provided for connecting the passages 36 and 38 with the line 12 and the passage 44 to a suitable line for discharging fluid through the bypass.

The chamber 34 and bypass 40 contain a valve assembly comprising a valve element 52 and the valve actuator 28 which are collectively operable to control the flow through the valve chamber and bypass. The valve body has an opening at the top through which the valve assembly may be inserted, first the valve actuator 28 and then the valve element 52, and a cover plate 54 is bolted to the top over the opening to retain the assembly in place. The bypass 40 contains an opening at the bottom through which the actuator 28 projects. The valve element 52 is cylindrical and has flat ends 56 and 58 of such diameter as to closely fit the cylindrical wall of the valve chamber. A clearance in the order of .002 inch is provided to enable axial movement of the element without appreciable lateral movement. The valve element intermediate its ends is smaller in diameter than the chamber and a coiled spring 60 mounted on the intermediate portion operates to hold the end of the valve element next to the seat 44 yieldably engaged therewith. The valve element contains an axial passage 62 which is closed at the end 56 and is open at the end 58, and a diametrical passage 64 which intersects the axial passage intermediate its ends. The end 58 is constituted by a flat disc 66 mounted across the open end of the valve element and contains a central hole 68 in communication with the axial passage 62. The ends of the valve element contain shallow spherical recesses 70 and 72 respectively.

The valve actuator 30 is of smaller diameter than the bypass and is mounted in the bypass with its inner end adjacent the hole 68 in the end 58 and its outer end projecting through the hole at the bottom of the bypass. The spring 30 heretofore mentioned is coiled about the inner end of the actuator with one end bearing against the end 58 and its other end bearing against an annular shoulder 74 on the valve actuator. The spring normally holds the valve actuator extended with its inner end spaced from the end of the valve element resting on the seat. To insure smooth and non-vibrant operation, the valve actuator is provided with a second annular shoulder 76 adjacent its lower end which rests on an O-ring 78. The O-ring 78 is seated on the annular portion of the bottom of the bypass surrounding the hole through which the actuator passes and not only cushions the actuator against vibration and shock, but also seals the actuator where it passes through the valve body. An O-ring 80 is also placed about the top of the valve chamber in an annular groove 82 provided for this purpose against which the cover 54 is bolted.

The spring 60 is much stiffer than the spring 30 hence depressing the valve actuator 28 closes the hole 68 in the end 58 without lifting the latter from the valve seat 44, so that flow is prevented from escaping from the valve chamber through the bypass and hence full pressure is delivered through the valve chamber to the diaphragm-actuated valve 16.

The depression 72 surrounding the opening 68 in the end 58 is substantially spherical and enables obtaining a good seal between the end of the actuator and the end 58.

Figure 4:
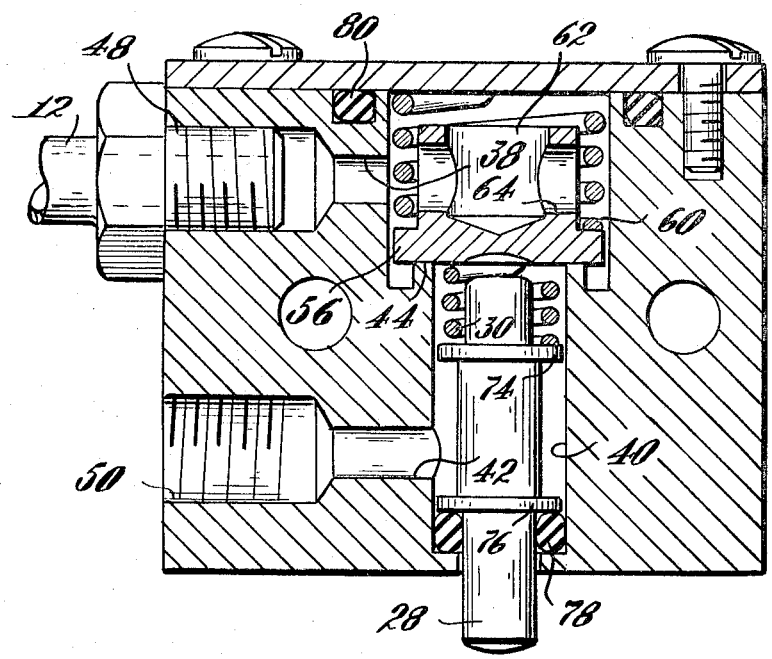
FIG. 4 is a view corresponding to FIG. 2 showing certain of the parts inverted for reverse action.

In accordance with this invention, it is desirable to reverse the action of the valve 10 without modifying the operation of the valve actuator, that is, without having to provide linkage or the like so that expansion of the bellows 26 will extend the actuator rather than depress it. This is accomplished herein by removing the cover plate 54, removing the valve element 52, reversing the valve element and replacing it in the valve chamber with the end 56 engaged with the valve seat 44 and with the open end next to the cover as shown in FIG. 4. The valve disc 66 at the open end is omitted to provide room at the top of the cylinder for movement of the valve element away from the valve seat. With the valve element reversed, depression of the valve actuator 28 compresses the spring 30 until the end of the valve actuator contacts the underside of the end 56 whereupon further depression lifts the end 56 away from the valve seat 44. As long as the end 56 has contact with the valve seat full pressure is delivered from the source 12 to the diaphragm-actuated valve 16. When the end 56 is lifted from the valve seat it allows pressure to flow from the valve chamber through the bypass 40 and passage 42 to the atmosphere. Extension of the valve actuator 28 in this case permits the valve end 56 to gradually close and thus restrict flow through the bypass and hence increases flow to the bellows-actuated valve 16. The recess 70 in the end 56 enables application of pressure to the end by the actuator without tilting of the end relative to the valve seat.

The valve is thus operable in either direct or indirect fashion by a reversal of the valve element and by either removing or restoring a component thereof without changing or modifying the valve actuator 28 and hence without disturbing the installation with which it is used.

The valve as pointed out heretofore is very small and its component moving parts so constricted in movement and so constrained by its springs as to be very insensitive to shock and/or vibration in any direction. Moreover the valve is responsive to a pressure differential of 1 to 2 pounds over a span of 3 to 15 p.s.i., has a valve actuator motion of approximately .010 inch, being all that is required to change the output from 3 to 15 p.s.i.

It should be understood that the present disclosure is for the purpose of illustration only and that this invention includes all modifications and equivalents which fall within the scope of the appended claims.

I claim:

1. A valve comprising a valve body containing a valve chamber and three passages in communication with the chamber; two of which constitute inlet and outlet passages for conducting fluid through the valve and the third of which constitutes a bypass for modifying flow through the valve, a valve element and actuator disposed in the chamber and bypass respectively, and means yieldingly holding the actuator spaced from the valve element; characterized in that the valve element is adapted to be reversibly mounted in the valve chamber so that movement of the actuator, in the same direction, in one position of the valve element will effect an increase in flow through the chamber and in the other position of the valve will effect a decrease in flow through the chamber.

2. A valve comprising a valve body containing a valve chamber, an inlet passage, an outlet passage and a bypass passage in said body in communication with said valve chamber, a valve element, an actuator situated in the valve chamber and bypass passage respectively; characterized in that the valve element and actuator control flow through the chamber and that the valve element is reversible in the valve chamber so that in one position of the valve element depression of the actuator effects a decrease in flow from the chamber to the bypass and in the other position of the valve element depression of the actuator effects an increase in flow from the chamber to the bypass.

3. A valve comprising a valve body containing a valve chamber, inlet, outlet and bypass passages in communication with the chamber, the axes of the inlet and outlet passages entering and leaving the chamber in a common plane and the axis of the bypass passage entering the valve at right angles to the plane of the axes of the inlet and outlet passages, a valve seat in the bypass passage, a valve element seated on the valve seat, an actuator operable, in conjunction with said valve element, to control the flow of fluid from the chamber to the bypass passage, said valve element being reversible in the chamber relative to the actuator, on the one hand to permit increase in flow through the bypass when the actuator is depressed, and on the other hand to decrease flow when the actuator is depressed.

4. A valve comprising a valve body containing a valve chamber, inlet, outlet and bypass passages in communication with the chamber, a valve seat in the bypass passage, a reversible valve element operable in one position, in conjunction with the valve seat, to close the bypass passage and in the other to open the bypass passage, and an actuator normally held spaced from the valve element operable in one position of the valve element by depression to increase the flow through the bypass and in the other position of the valve element to decrease the flow through the bypass.

5. A valve comprising a valve body containing a valve chamber, inlet, outlet and bypass passages in communication with the chamber, a valve seat in the bypass passage, a reversible valve element, a valve actuator operable by depression in one position of the valve element to effect an increase in flow to the bypass and in the other position of the valve element to effect a decrease in flow to the bypass, first means yieldingly holding the valve element on the seat in either position and second means yieldingly holding the valve actuator spaced from the valve element, said second yieldable means being yieldable at a lesser pressure than the first yieldable means.

6. A valve comprising a valve body containing a valve chamber and a bypass passage in communication with the chamber, a valve seat in the bypass passage, a reversible valve element supported on the seat, said valve element having opposed end portions adapted to have contact with the seat, an axial passage therebetween, one end of which is closed and the other end of which is open, and a right-angularly disposed passage intersecting the axial passage in communication with the chamber in either position of the valve element, and means for alternately holding the valve element on the seat in an "on" or an "off" position wherein a decrease or increase in flow through the valve is obtained by movement of the actuator in a single direction.

7. A valve comprising a valve body containing a valve chamber through which pressure fluid is adapted to flow, said valve chamber having a bypass passage in communication therewith, a valve seat in the bypass, a valve element having ends alternately engageable with the seat, said valve element having an axial passage closed at one end and open at the other, and a diametrical passage intersecting the axial passage in communication with the chamber when either end of the valve element is seated on the valve seat, spring means operating to hold the end of the valve element engaged with the seat against the seat, and an actuator cooperable with the valve element, on the one hand to lift the closed end of the valve element off the seat and on the other hand to close the open end of the axial passage in the valve element.

8. A valve comprising a valve body containing a valve chamber through which fluid is adapted to flow, and a bypass in communication with the chamber, a seat in the bypass, a valve element mounted on the seat, said valve element embodying spaced parallel ends, a passage at right angles to said ends, one end of which is closed and the other end of which is open, and a passage intermediate the ends intersecting the passage at right angles to said ends, a coiled spring disposed about the valve element operable, by engagement with one end of the valve element and the other end with the valve body, to hold either end of the valve element engaged with the valve seat, said valve element being reversible, on the one hand to position the end at the closed end of the passage against the seat and on the other hand to hold the end at the open end of the passage against the seat, and a valve actuator mounted in the bypass operable, by movement in a direction perpendicular to the end of the valve element engaged with the valve seat, on the one hand to close the opening in the open end of the valve element and on the other hand to lift the closed end of the valve element from the seat.

No references cited.

M. CARY NELSON, *Primary Examiner.*

R. J. MILLER, *Assistant Examiner.*